(12) United States Patent
Tsyrganovich (10) Patent No.: US 7,688,307 B1
(45) Date of Patent: Mar. 30, 2010

(54) DETERMINING THE DISTANCE AN OBJECT HAS MOVED USING AN ACCELEROMETER

(75) Inventor: Anatoliy V. Tsyrganovich, San Jose, CA (US)

(73) Assignee: ZiLOG, Inc., San Jose, CA (US)

( * ) Notice: Subject to any disclaimer, the term of this patent is extended or adjusted under 35 U.S.C. 154(b) by 1032 days.

(21) Appl. No.: 11/339,233

(22) Filed: Jan. 24, 2006

(51) Int. Cl.
*G06F 3/033* (2006.01)
*G09G 5/08* (2006.01)

(52) U.S. Cl. .................... 345/158; 345/157; 345/163
(58) Field of Classification Search ......... 345/157–163, 345/179
See application file for complete search history.

(56) References Cited

U.S. PATENT DOCUMENTS

| | | | |
|---|---|---|---|
| 4,386,346 A | 5/1983 | Levine | |
| 4,787,051 A | 11/1988 | Olson | |
| 4,839,838 A | 6/1989 | LaBiche et al. | |
| 4,916,650 A | 4/1990 | Oikawa | |
| 4,922,444 A | 5/1990 | Baba | |
| 5,181,181 A | 1/1993 | Glynn | |
| 5,703,623 A | 12/1997 | Hall et al. | |
| 5,955,667 A * | 9/1999 | Fyfe ........................... | 73/490 |
| 6,072,467 A | 6/2000 | Walker | |
| 6,104,390 A | 8/2000 | Sturgeon et al. | |
| 6,181,329 B1 | 1/2001 | Stork et al. | |
| 6,212,296 B1 | 4/2001 | Stork et al. | |
| 6,492,981 B1 | 12/2002 | Stork et al. | |
| 6,498,604 B1 | 12/2002 | Jensen | |
| 6,856,327 B2 | 2/2005 | Choi | |
| 6,861,946 B2 | 3/2005 | Verplaetse et al. | |
| 6,906,703 B2 | 6/2005 | Vablais | |
| 6,933,933 B2 * | 8/2005 | Fleming ...................... | 345/179 |
| 6,956,564 B1 | 10/2005 | Williams | |
| 6,957,923 B2 | 10/2005 | Lapstun et al. | |
| 7,369,345 B1 * | 5/2008 | Li et al. ........................ | 360/75 |
| 2003/0023645 A1 | 1/2003 | Walster | |
| 2004/0155860 A1 | 8/2004 | Wenstrand et al. | |
| 2005/0190158 A1 * | 9/2005 | Casebolt et al. ............. | 345/166 |
| 2005/0212911 A1 * | 9/2005 | Marvit et al. ................ | 348/154 |
| 2006/0214913 A1 * | 9/2006 | Pedrazzini et al. .......... | 345/163 |
| 2008/0122788 A1 * | 5/2008 | Sirtori ......................... | 345/158 |

FOREIGN PATENT DOCUMENTS

JP 2004246445 9/2004

* cited by examiner

*Primary Examiner*—Amare Mengistu
*Assistant Examiner*—Dmitriy Bolotin
(74) *Attorney, Agent, or Firm*—Imperium Patent Works; Darien K. Wallace (57) ABSTRACT

An accelerometer-based mouse is one example of a device that determines the distance an object moves. The mouse disables a cursor from moving across a computer screen during movements of the mouse that occur while the mouse is lifted from a working surface. A mouse control unit generates a cursor movement disable signal that stops the cursor from moving from the time the mouse is lifted until the mouse is set down. The mouse control unit generates the disable signal by determining the derivative of an acceleration signal for the vertical (z) dimension relative to the working surface. The mouse includes a microcontroller programmed to disengage cursor movement when the cursor movement disable signal is asserted. The mouse does not include a ball and rollers whose performance can degrade as they become dirty. The mouse can detect movement even when the mouse slides over a surface that has no pattern.

30 Claims, 8 Drawing Sheets

DETERMINING THE DISTANCE AN OBJECT HAS MOVED USING AN ACCELEROMETER

TECHNICAL FIELD

The present invention relates generally to determining the distance that an object moves by using an accelerometer and, more specifically, to detecting the movement of an accelerometer-based mouse to control a cursor.

BACKGROUND

Many useful applications rely on determining the distance that an object has moved. For example, it is useful to know the distance that a shipping container, a car, or even a valuable sculpture has moved. Another application for using the distance that an object has moved involved a computer mouse. Personal computers, such as desktop, laptop and notebook computers, typically include a computer mouse through which the user controls a cursor on a screen of the personal computer. The cursor moves across the screen based on the movement of the mouse.

One type of computer mouse includes a ball and a mechanism for detecting rotation of the ball as the user slides the mouse over a flat surface, such as a mouse pad. The mechanism includes two rollers that roll on the surface of the ball. Each roller is coupled to an emitter/detector that detects rotation and direction of rotation of the roller. One roller is used to detect movement in the x direction, and the other roller is used to detect movement in the y direction. The mouse also includes a processor that analyzes signals indicative of the detected movement. The user thereby moves the mouse to control the movement of an icon on the computer screen, such as a cursor.

A computer mouse that uses a ball has certain disadvantages. The ball does not roll if the working surface is not rough or sticky enough. Thus, mouse pads are typically used. Moreover, the ball picks up dirt and other unwanted particles as it rolls along the mouse pad. Dirt builds up on the rollers and degrades performance, such as when the cursor becomes stuck or moves only in one direction. In addition, the moving mechanical parts of the mouse are subject to wear and limit the life and utility of the mouse.

A second type of computer mouse addresses some of the aforementioned problems. Such an optical mouse has no ball and rollers and can become dirty. An optical mouse detects movement by reflecting light from the surface over which the mouse slides. Typically, light-emitting diodes (LEDs) are used to emit the light and detect the reflected light. But such LEDs and their associated electrical circuits are relatively expensive and complicated to manufacture. The optical mouse detects movement by detecting the reflection of light from a surface having a pattern. Therefore, an optical mouse may not accurately detect movement over a white piece of paper or even over an airplane tray table.

A computer mouse is sought that detects motion of the mouse using neither a ball nor light emitting diodes. Moreover, a computer mouse is sought that can detect the motion of the mouse moving over a surface that has no pattern.

SUMMARY

A mouse for a personal computer includes an accelerometer, but has no ball or light-emitting diode. The accelerometer-based mouse outputs x-coordinate and y-coordinate signals that instruct the personal computer how to control the movement of the cursor across the computer screen. The accelerometer-based mouse deactivates the cursor movement function of a cursor while the accelerometer-based mouse is lifted from a working surface. Movement of the cursor in response to movements of the accelerometer-based mouse is disabled from the time the mouse is lifted until the mouse is set down.

The accelerometer-based mouse includes a microcontroller that is programmed to disengage movement of the cursor when a cursor movement disable signal is asserted. The microcontroller includes a mouse control unit, an analog-to-digital converter and a clock. The analog-to-digital converter digitizes acceleration signals received from the accelerometer. A z-acceleration signal indicates acceleration in the vertical (z) dimension with respect to the working surface. The mouse control unit generates the cursor movement disable signal from a pseudo-square wave.

The mouse control unit generates the pseudo-square wave by determining the first and the second derivatives of the digitized z-acceleration signal received from the analog-to-digital converter. The absolute values of the first and second derivatives of the digitized z-acceleration signal are then added so as to obtain the pseudo-square wave that exhibits pulses during the upward and downward movements of the mouse. By adding the first and second derivatives of the digitized z-acceleration signal, the lowest notch of each pulse of the pseudo-square wave has a greater digital amplitude than does the highest peak of noise of the pseudo-square wave. In one embodiment, the microcontroller is programmed to perform the steps of the mouse control unit. In another embodiment, the mouse control unit is a hardwired component of the microcontroller.

A method is disclosed for deactivating the cursor movement function of a cursor using an acceleration signal indicating the acceleration of a mouse in the vertical (z) dimension with respect to a working surface. The z-acceleration signal is digitized, and the first and second derivatives are determined. The absolute values of the first and second derivatives of the digitized z-acceleration signal are then added to obtain a pseudo-square wave exhibiting pulses during the upward and downward movements of the mouse. A cursor movement disable signal is generated using the pseudo-square wave. The cursor movement disable signal is asserted from the time the mouse is moved upwards until the mouse is set down on the working surface. The cursor is disabled from moving across a computer screen when the cursor movement disable signal is asserted.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
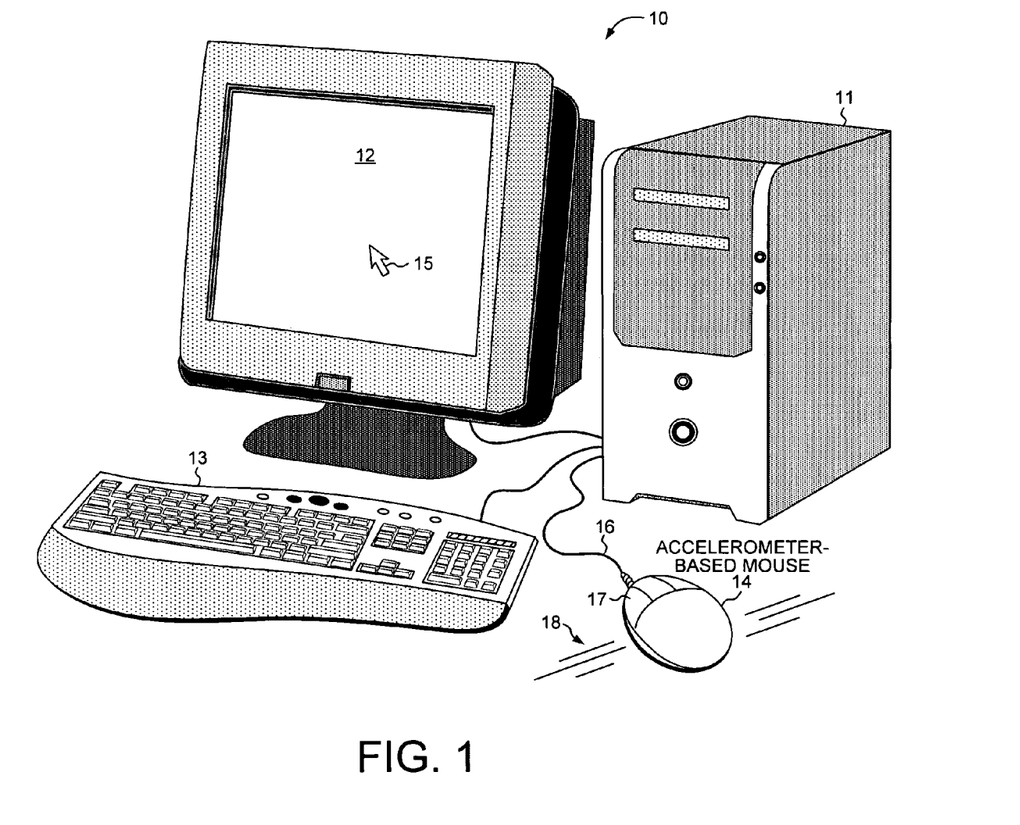
FIG. 1 is a diagram of a personal computer system including an accelerometer-based mouse.

FIG. 1 shows a personal computer system 10 that includes a computer 11, a monitor or screen 12, a keyboard 13 and an accelerometer-based mouse (AB mouse) 14. Movement of a cursor 15 across screen 12 is controlled using AB mouse 14. AB mouse 14 is connected to the computer through a cable 16. In other embodiments, AB mouse 14 communicates wirelessly with computer 11 through an infrared (IR) signal or a radio frequency (RF) signal. AB mouse 14 has multiple buttons, including a left button 17 that can be clicked. In other embodiments, computer system 10 is a laptop computer, a notebook computer or a personal digital assistant (PDA), each having an integrated screen, keyboard and pad-mouse or stick-mouse.

AB mouse 14 includes accelerometers that are used to detect the relative motion of AB mouse 14. AB mouse 14 does not, however, include a ball and rollers whose performance degrades as they become dirty. Neither does AB mouse 14 include an LED that detects the reflection of light from a surface over which the mouse slides. The accelerometers detect motion without regard to a mouse pad or working surface 18, and the movement of AB mouse 14 can be detected as AB mouse 14 slides over a surface that has no pattern. Because the accelerometers detect motion of AB mouse 14 without regard to any surface, however, the distance of AB mouse 14 to a surface cannot be used to determine when the cursor movement function of the cursor should be deactivated. Nevertheless, cursor 15 stops moving when AB mouse 14 is elevated. Thus, AB mouse 14 can be operated in the manner in which computer users have become accustomed. For example, when AB mouse 14 is at the right edge of working surface 18, but the user nevertheless wants the cursor to move farther to the right, the user lifts AB mouse 14 and places it in the middle of working surface 18 without moving cursor 15 to the left.

Figure 2:
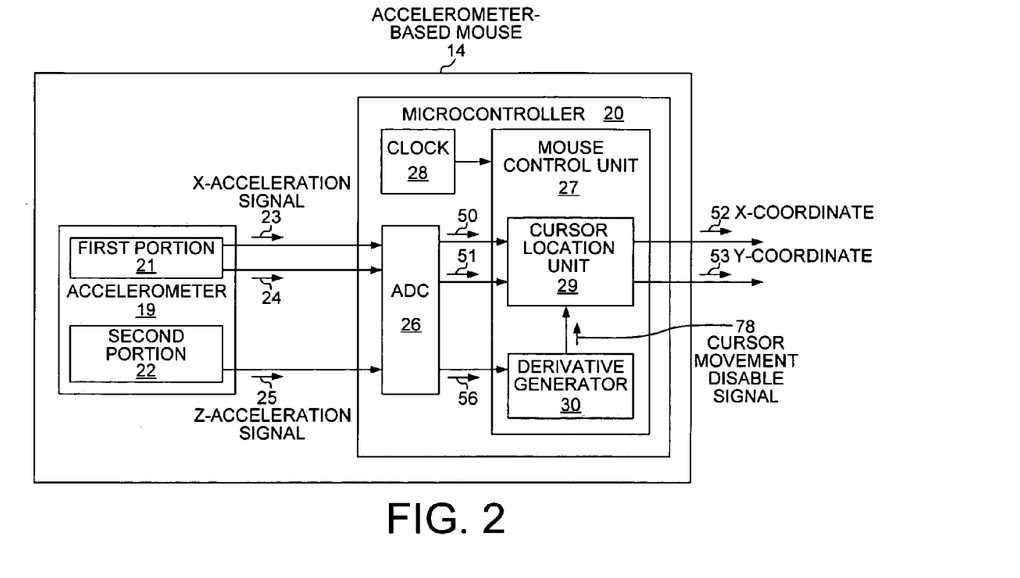
FIG. 2 is a schematic circuit diagram of the accelerometer-based mouse of FIG. 1, including a mouse control unit.

FIG. 2 is a simplified schematic diagram of accelerometer-based mouse 14 according to the present invention. AB mouse 14 includes a three-dimensional accelerometer 19 in communication with a microcontroller 20.

In this embodiment, accelerometer 19 is a single silicon, micro-machined, linear tri-axis accelerometer. Accelerometer 19 includes a sensor element and an application specific integrated circuit (ASIC) packaged in a dual flat no-lead frame. The sensor functions on the principle of differential capacitance. Acceleration causes displacement within a silicon structure resulting in a change in capacitance. The ASIC detects and transforms changes in capacitance into a voltage proportional to acceleration. Accelerometer 19 includes a first portion 21 and a second portion 22. First portion 21 is oriented in AB mouse 14 horizontally to working surface 18, whereas second portion 22 is oriented vertically to working surface 18. First portion 21 outputs an x-acceleration signal 23 indicative of the acceleration of AB mouse 14 in the x direction. First portion 21 also outputs a y-acceleration signal 24 indicative of acceleration in the y direction. Second portion 22 outputs a z-acceleration signal 25 indicative of acceleration in the z direction.

Microcontroller 20 includes an analog-to-digital converter (ADC) 26, a mouse control unit 27 and a clock 28. Mouse control unit 27 includes a cursor location unit 29 and a derivative generator 30. Microcontroller 20 is essentially a computer on a chip that is used as a specialized digital signal processor embedded within AB mouse 14. For example, microcontroller 20 is a Z8 Encore! microcontroller manufactured by ZiLOG, Inc. of San Jose, Calif. In one embodiment, derivative generator 30 is functionality of microcontroller 20 that has been programmed to generate first and second waveform derivatives. In another embodiment, derivative generator 30 is an arithmetic logic unit (ALU) of microcontroller 20 this is hardwired to generate first and second waveform derivatives. Similarly, cursor location unit 29 can be realized by programming microcontroller 20 or by dedicated hardware within microcontroller 20.

Figure 3:
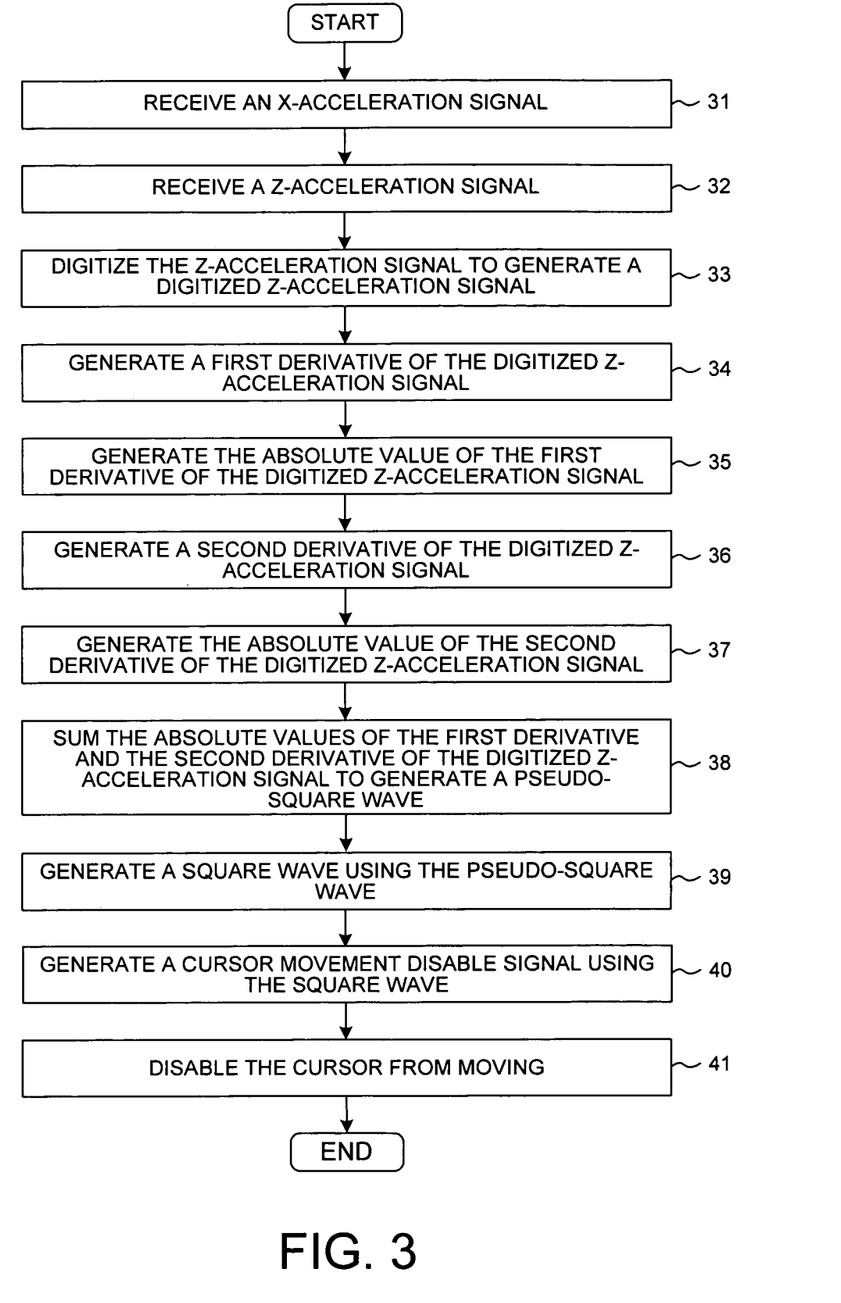
FIG. 3 is flowchart of steps showing the operation of the accelerometer-based mouse of FIG. 2.
Figure 4:
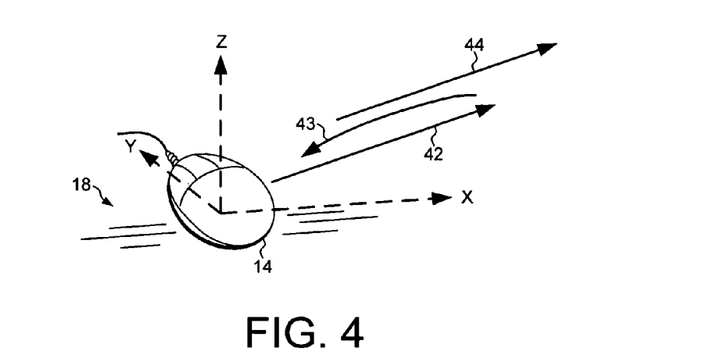
FIG. 4 is a diagram illustrating three movements of the accelerometer-based mouse of FIG. 2.

FIG. 3 is a flowchart illustrating steps 31-41 of a method by which system AB mouse 14 controls the movement of cursor 15 across screen 12. The method disables the movement of cursor 15 when AB mouse 14 is lifted. The steps of FIG. 3 will now be described in relation to the operation of AB mouse 14, as shown in FIG. 2. In addition, the method is described for three hypothetical movements of AB mouse 14 across working surface 18, as illustrated in FIG. 4. In a first movement 42, AB mouse 14 is slid towards the upper right edge of working surface 18. Then in a second movement 43, AB mouse 14 is lifted, moved back to the center of working surface 18 and set down. Finally, in a third movement 44, AB mouse 14 is again slid toward the upper right edge of working surface 18.

In a first step 31 of FIG. 3, microcontroller 20 receives x-acceleration signal 23 and y-acceleration signal 24 that are output by first portion 21 of accelerometer 19. First portion 21 registers acceleration in both the x and y directions as AB mouse 14 begins first movement 42.

Figure 5A:
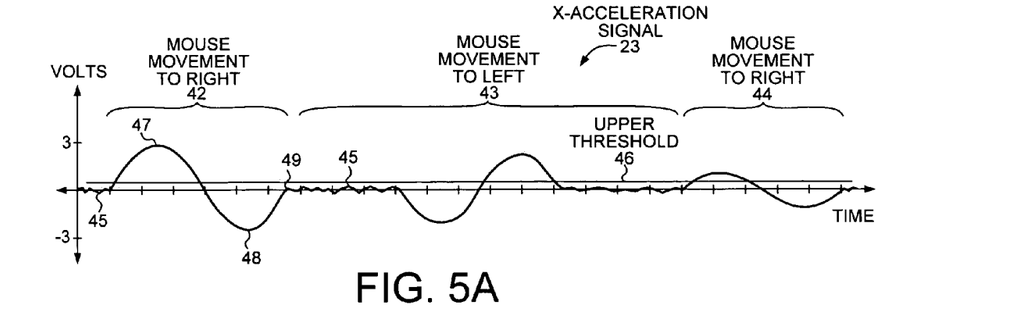
FIGS. 5A-K are waveform diagrams illustrating the operation of the accelerometer-based mouse of FIG. 2.

FIGS. 5A-5K are waveform diagrams that illustrate various steps of the method of FIG. 3. FIG. 5A shows the analog voltage versus time of x-acceleration signal 23. The units of time on the x-axis are not labeled because the particular time values do not play a significant role in the operation of the present invention. The present invention will operate regardless of whether the mouse is moved quickly or slowly. The time in FIGS. 5B-5J is aligned to the time in the diagram of FIG. 5A. The voltage of x-acceleration signal 23 ranges from 3 to −3 volts. Alternative embodiments may have other voltage ranges.

FIG. 5A illustrates the voltage waveform of x-acceleration signal 23 during the three movements 42-44. FIG. 5A shows that even while AB mouse 14 is stationary before first movement 42, signal 23 has some amount of fluctuating voltage amplitude representing noise 45 below a noise threshold 46. When AB mouse 14 begins to move to the right, accelerometer 19 registers a positive acceleration that peaks at point 47. At constant speed, AB mouse 14 exhibits an acceleration of zero. As AB mouse 14 approaches the right upper edge of working surface 18, the mouse begins to decelerate to a maximum negative acceleration at point 48 until AB mouse 14 comes to a stand still at point 49. Point 49 represents the end of first movement 42, at which point AB mouse 14 is no longer moving with respect to the x-axis of the Cartesian plane of working surface 18. Again, noise 45 is present in x-acceleration signal 23 after AB mouse 14 stops moving.

ADC 26 receives x-acceleration signal 23 and y-acceleration signal 24 from accelerometer 19. In one embodiment, ADC 26 is a 10-bit analog-to-digital converter. ADC 26 converts x-acceleration signal 23 into a digital signal 50 and converts y-acceleration signal 24 into a digital signal 51. Cursor location unit 29 receives digital signals 50 and 51, which are indicative of the acceleration of AB mouse 14 in the x and y dimensions. Using a clock signal from clock 28, cursor location unit 29 integrates digital signals 50 and 51 over time to determine the distance that AB mouse 14 moves in the x and y dimensions, respectively. Cursor location unit 29 then outputs x-coordinate signal 52 and y-coordinate signal 53 indicative of the x-coordinate and y-coordinate, respectively, of cursor 15 on screen 12. Computer 11 then uses x-coordinate signal 52 and y-coordinate signal 53 to position cursor 15 on screen 12.

In a step 32, ADC 26 receives z-acceleration signal 25 as second portion 22 of accelerometer 19 registers acceleration in the z direction as AB mouse 14 is lifted at the beginning of movement 43.

Figure 5B:
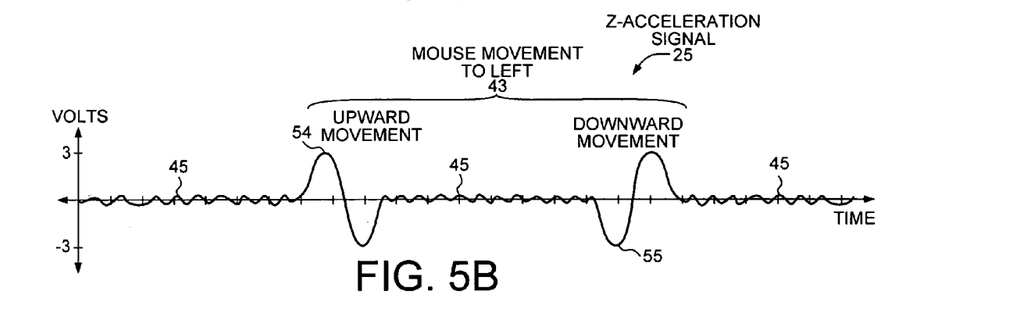

FIG. 5B illustrates an analog voltage waveform of z-acceleration signal 25 during second movement 43. When AB mouse 14 is lifted, accelerometer 19 first registers a positive acceleration that peaks at point 54 and then a deceleration before AB mouse 14 reaches the top of its upward movement. During second movement 43, AB mouse 14 is moved back to the center of working surface 18 before it is set down. As AB mouse 14 is moved back and left along the x-axis, x-acceleration signal 23 first indicates an acceleration in the left direction (negative acceleration). Because the distance and speed covered by the movement to the left is less than that for the movement to the right, the voltage values are lower. Then x-acceleration signal 23 indicates a deceleration in the left direction (positive acceleration) towards the end of second movement 43 and before AB mouse 14 is set down. FIG. 5B shows that when AB mouse 14 is set down, accelerometer 19 first registers a negative acceleration that peaks at point 55 and then a negative deceleration before AB mouse 14 reaches working surface 18. Noise 45 is also present on z-acceleration signal 25.

Figure 5C:
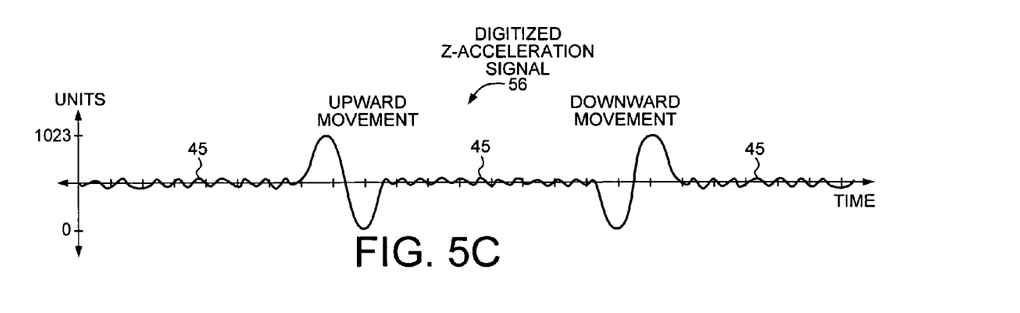

Steps 33-41 of the method of FIG. 3 allow mouse control unit 27 to output x-coordinate signal 52 and y-coordinate signal 53 indicating no movement of cursor 15 during movement 43 of AB mouse 14. In a step 33, ADC 26 digitizes z-acceleration signal 25 and outputs a digitized z-acceleration signal 56. FIG. 5C is a waveform diagram showing a 10-bit digital waveform of digitized z-acceleration signal 56. The magnitude of the waveform in FIG. 5C can range from zero to 1023 digital units. Derivative generator 30 receives digitized z-acceleration signal 56.

Figure 5D:
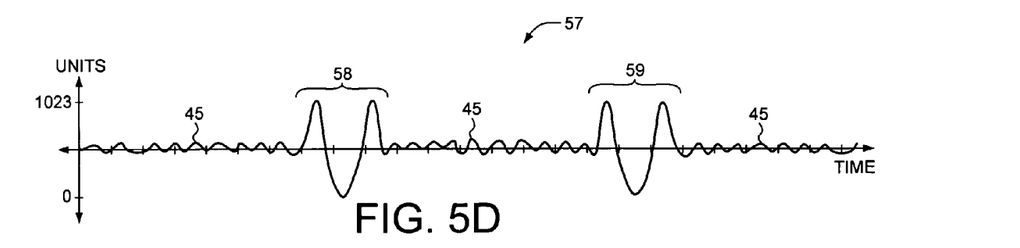

In a step 34, derivative generator 30 generates a first derivative 57 of digitized z-acceleration signal 56. FIG. 5D is a waveform diagram showing a 10-bit digital waveform of a first derivative 57 of digitized z-acceleration signal 56. The magnitude of the waveform in FIG. 5D can range from zero to 1023 digital units. A waveform segment 58 of first derivative 57 corresponds to the portion of digitized z-acceleration signal 56 that occurs as AB mouse 14 is lifted at the beginning of second movement 43. A waveform segment 59 of first derivative 57 corresponds to the portion of digitized z-acceleration signal 56 that occurs as AB mouse 14 is set down at the end of second movement 43.

Figure 5E:
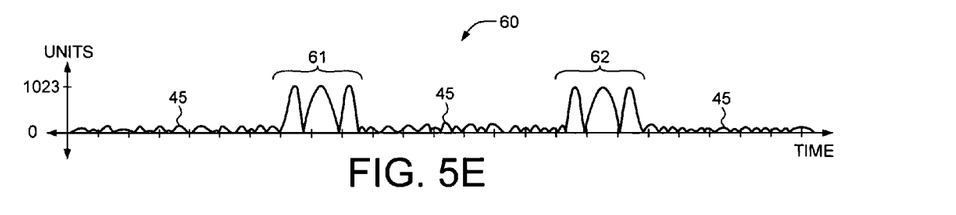

In a step 35, derivative generator 30 generates the absolute value of first derivative 57 of digitized z-acceleration signal 56. FIG. 5E is a waveform diagram showing a 10-bit digital waveform of an absolute value 60 of the first derivative of the digitized z-acceleration signal. A waveform segment 61 of absolute value 60 corresponds to the portion of digitized z-acceleration signal 56 that occurs during the upward movement of AB mouse 14. A waveform segment 62 of absolute value 60 corresponds to the portion of digitized z-acceleration signal 56 that occurs during the downward movement of AB mouse 14.

Figure 5F:
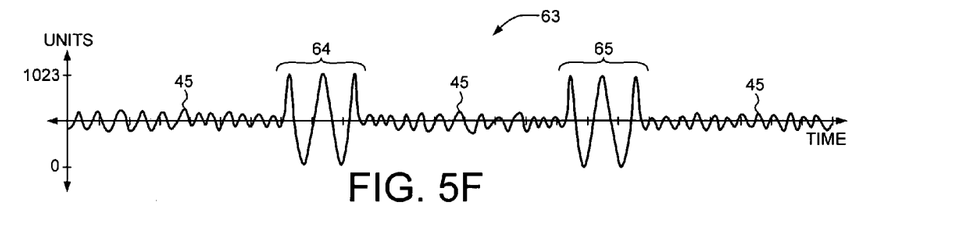

In a step 36, derivative generator 30 generates the second derivative of digitized z-acceleration signal 56. FIG. 5F is a waveform diagram showing a 10-bit digital waveform of a second derivative 63 of digitized z-acceleration signal 56. A waveform segment 64 of second derivative 63 corresponds to the portion of digitized z-acceleration signal 56 that occurs as AB mouse 14 is lifted at the beginning of second movement 43. A waveform segment 65 of second derivative 63 corresponds to the portion of digitized z-acceleration signal 56 that occurs as AB mouse 14 is set down at the end of second movement 43.

Figure 5G:
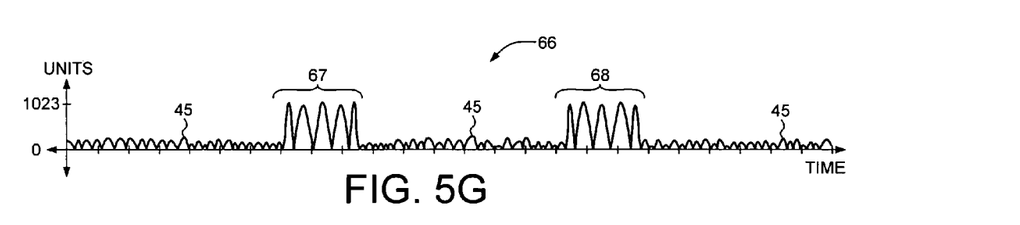

In a step 37, derivative generator 30 generates the absolute value of second derivative 63 of digitized z-acceleration signal 56. FIG. 5G is a waveform diagram showing a 10-bit digital waveform of an absolute value 66 of the second derivative of the digitized z-acceleration signal. A waveform segment 67 of absolute value 66 corresponds to the portion of digitized z-acceleration signal 56 that occurs during the upward movement of AB mouse 14. A waveform segment 68 of absolute value 66 corresponds to the portion of digitized z-acceleration signal 56 that occurs during the downward movement of AB mouse 14.

Figure 5H:
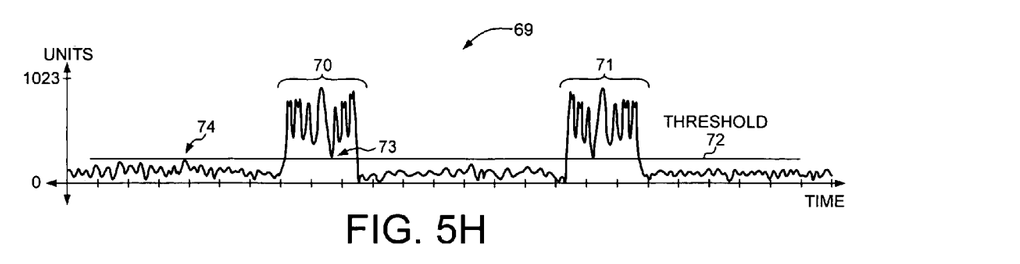

In a step 38, derivative generator 30 adds the waveforms of absolute value 60 and absolute value 66 to generate a pseudo-square wave 69. FIG. 5H is a waveform diagram of pseudo-square wave 69, including a first pulse 70 and a second pulse 71. First pulse 70 occurs as AB mouse 14 is lifted at the beginning of second movement 43. Second pulse 71 occurs as AB mouse 14 is set down at the end of second movement 43. By adding the absolute values of the first and second derivatives of digitized z-acceleration signal 56, the lowest notch of first pulse 70 and second pulse 71 is raised above a threshold 72 set higher than the highest peak of noise of pseudo-square wave 69. For example, the lowest notch 73 of first pulse 70 has a larger digital value than the value of the highest peak 74 of noise of pseudo-square wave 69. Threshold 72 is set higher than the highest noise peak by a predetermined safety margin.

Figure 5I:
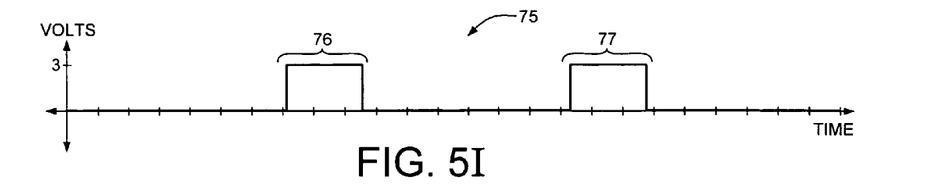

In a step 39, derivative generator 30 generates a square wave 75 using pseudo-square wave 69. Square wave 75 is asserted at all times during which the amplitude of pseudo-square wave 69 is above threshold 72. FIG. 5I shows square wave 75 with a first square pulse 76 that occurs as AB mouse 14 is lifted and a second square pulse 77 that occurs as AB mouse 14 is set down.

Figure 5J:
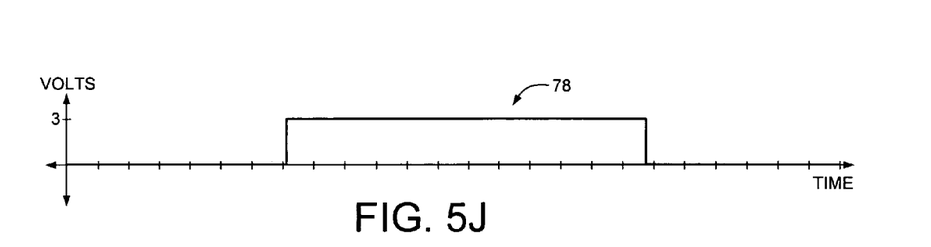

In a step 40, derivative generator 30 generates a digital cursor movement disable signal 78 using square wave 75. Cursor movement disable signal 78 is asserted during the time period between the rising edge of first square pulse 76 and the falling edge of second square pulse 77. FIG. 5J is a waveform diagram showing cursor movement disable signal 78. Derivative generator 30 outputs cursor movement disable signal 78 to cursor location unit 29.

In a step 41, cursor location unit 29 receives cursor movement disable signal 78 and disables cursor 15 from moving across screen 12 at all times when cursor movement disable signal 78 is asserted. Cursor location unit 29 disables cursor 15 from moving by canceling the amplitudes of digital signals 50 and 51 while cursor movement disable signal 78 is asserted. Cursor location unit 29 then outputs x-coordinate signal 52 and y-coordinate signal 53 with x and y coordinates, respectively, that do not change while cursor movement disable signal 78 is asserted. Consequently, computer 11 does not change the position of cursor 15 on screen 12 while cursor movement disable signal 78 is asserted.

Figure 5K:
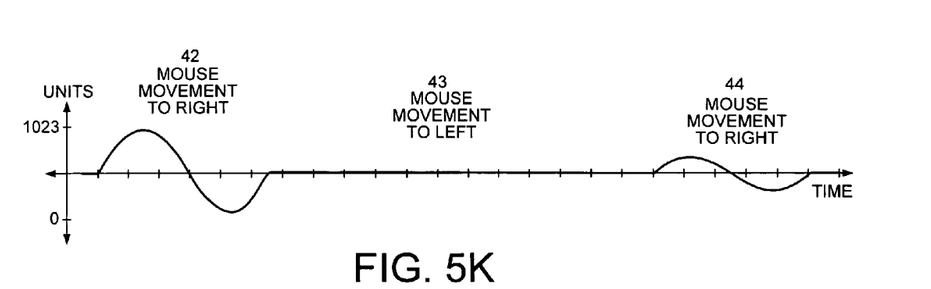

FIG. 5K shows digital signal 50 obtained from x-acceleration signal 23 after the digital amplitude of digital signal 50 has been reduced to a baseline value during the period when cursor movement disable signal 78 is asserted. The effect of canceling the amplitudes of digital signals 50 and 51 while cursor movement disable signal 78 is asserted is to stop cursor 15 from moving during second movement 43 from the time AB mouse 14 is lifted from working surface 18 until AB mouse 14 is set down. This allows a user of personal computer system 10 to move cursor 15 farther across screen 12 after AB mouse 14 has come to the edge of working surface 18. In the example of FIG. 4, cursor 15 moves to the upper right as AB mouse 14 is slid in first movement 42 towards the upper right edge of working surface 18. Then after AB mouse 14 is lifted in second movement 43 and until AB mouse 14 is set down, the movement of cursor 15 is disabled. Finally, cursor 15 moves farther to the upper right as AB mouse 14 is again slid toward the upper right edge of working surface 18 in third movement 44.

Figure 6:
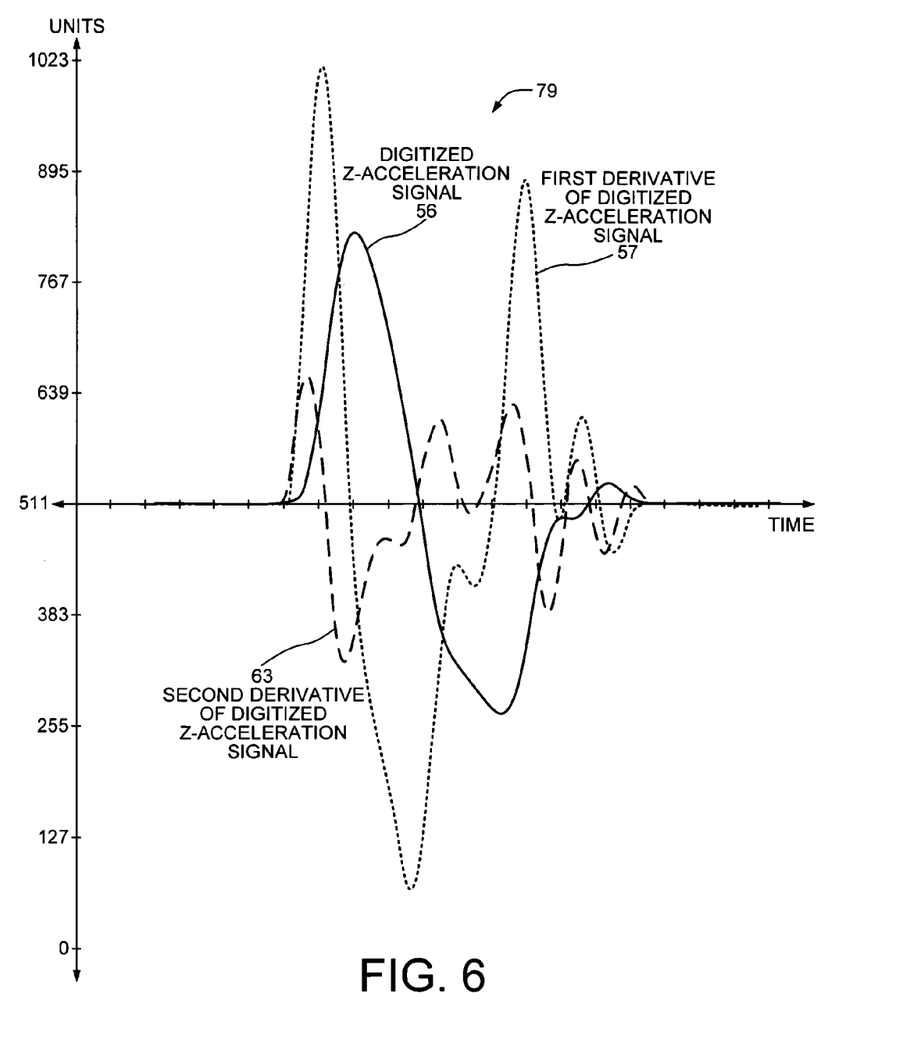
FIG. 6 is a waveform diagram showing portions of the waveforms of FIGS. 5C, 5D and 5F in more detail.

FIG. 6 illustrates in greater detail how the digital magnitude of various waveforms 79 in microcontroller 20 vary over time during first movement 42 of AB mouse 14. FIG. 6 shows portions of digitized z-acceleration signal 56, first derivative 57 of the digitized z-acceleration signal, and second derivative 63 of the digitized z-acceleration signal.

Figure 7:
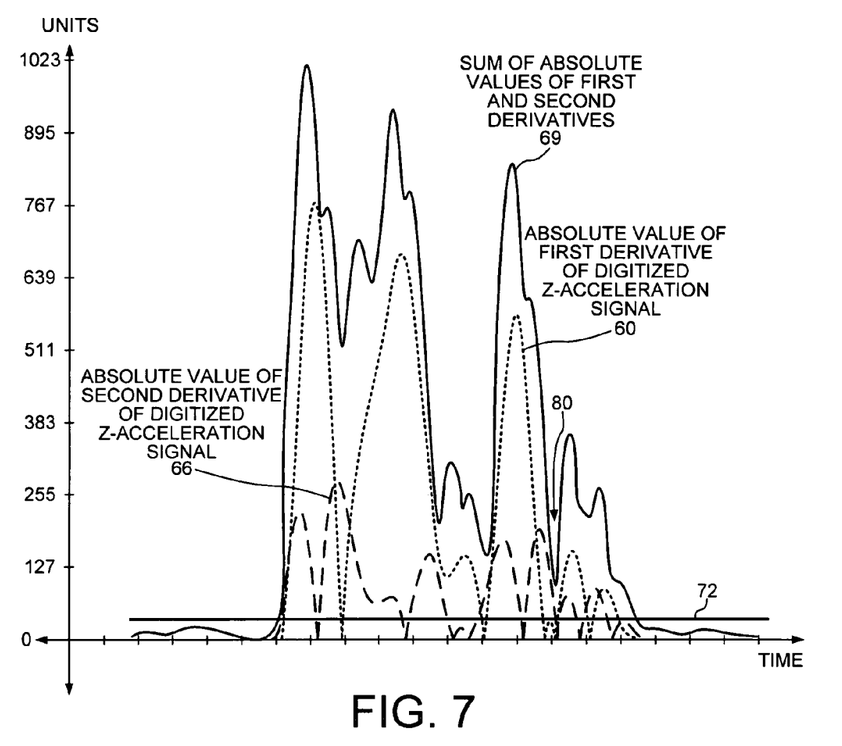
FIG. 7 is a waveform diagram showing portions of the waveforms of FIGS. 5E, 5G and 5H in more detail.

FIG. 7 illustrates in greater detail the absolute values of first derivative 57 and second derivative 63 of FIG. 6, as well as the sum of the absolute values. FIG. 7 shows portions of absolute value 60 of the first derivative of the digitized z-acceleration signal and portions of absolute value 66 of the second derivative of the digitized z-acceleration signal. In addition, FIG. 7 shows portions of pseudo-square wave 69 that is generated by adding the waveforms of absolute value 60 and absolute value 66. FIG. 7 shows that the lowest notch 80 of pseudo-square wave 69 has a greater digital amplitude than does threshold 72, which is set higher than the highest peak of noise of pseudo-square wave 69.

Although the present invention has been described in connection with certain specific embodiments for instructional purposes, the present invention is not limited thereto. Cursor location unit 29 receives cursor movement disable signal 78 in the embodiment of FIG. 2. In another embodiment, however, cursor movement disable signal 78 is output from AB mouse 14 directly from derivative generator 30. Computer 11 then receives cursor movement disable signal 78 along with x-coordinate signal 52 and y-coordinate signal 53. Computer 11 then cancels any movement indicated by x-coordinate signal 52 and y-coordinate signal 53 at all times when cursor movement disable signal 78 is asserted. Accelerometer-based mouse 14 is described in relation to a computer mouse. Application of the present invention, however, is not limited to a computer mouse and may include other computer peripherals, such as computer pens, joysticks and the like. The present invention can be used to control a cursor not only on a computer screen, but also on monitors that interface to equipment, such as medical equipment or industrial equipment. Although the embodiment of FIG. 2 has been described as comprising two accelerometers, the invention may employ another number of accelerometers.

The present invention relates generally determining the distance that an object has moved, and can be applied in many applications other than the specific embodiment of an accelerometer-based computer mouse. In one example, a vehicle location unit and a vehicle derivative generator are used to determine the distance that a vehicle travels. Such a vehicle location unit and a vehicle derivative generator are attached to the vehicle and have structures similar to cursor location unit 29 and derivative generator 30. The vehicle derivative generator, however, differs from derivative generator 30 in that it generates a movement detection enable signal instead of cursor movement disable signal 78. Movement detection enable signal is asserted at all time during which a digitized z-acceleration signal exhibits a peak of an upward or downward movement within a predetermined time period from a previous peak. As the vehicle travels over bumps in the road, the vehicle location unit determines the distance that a vehicle travels. When the vehicle is parked, the movement detection enable signal is deasserted, and the vehicle location unit is powered down. In this manner, the distance that the vehicle travels in tunnels and parking garages can be determined, which is not possible using conventional GPS satellite positioning technology. In this application, the invention can be used to track stolen vehicles.

In another example of using the invention to determine the distance that an object is moved, a container location unit is integrated with a transmitting RFID tag and attached to a container of goods. Such transmitting RFID tags can transmit signals even as far at 50 feet. A movement detection enable signal is asserted when any of the digitized acceleration signals (x, y or z) exhibits a peak of movement within a predetermined time period from a previous peak of movement. The container location unit determines the movement of the container in three dimensions while the movement detection enable signal is asserted. When the container is not moving and the movement detection enable signal is deasserted, the container location unit is powered down. When the RFID tag transmits a signal to an RFID reader, the RFID tag outputs the location of the container in three dimensions. This application of the invention is useful, for example, in warehouses and store rooms to locate a particular container or box of goods.

In yet another example, an object location unit is attached to a valuable item to detect movement of the valuable item beyond a restricted area. For example, an object location unit and a derivative generator are attached to a valuable painting in a museum. When the painting is moved and re-hung in a different room, the movement detection enable signal is asserted and the object location unit determines the movement of the painting in three dimensions. In one embodiment, the object location unit transmits a position signal to a central computer. The central computer generates an alarm signal when the central computer determines that the painting has moved beyond an allowed area within the museum. In another embodiment, the object location unit itself determines when the painting has moved beyond the allowed area, and the object location unit itself generates an alarm signal.

In other examples, the invention can be used in security systems that monitor the movement of sliding doors and windows, and generally in tracking the movement of predetermined objects. Accordingly, various modifications, adaptations, and combinations of various features of the described embodiments can be practiced without departing from the scope of the invention as set forth in the claims.

What is claimed is:

1. A device comprising:
an accelerometer that generates an acceleration signal having a magnitude;
an analog-to-digital converter (ADC), wherein the ADC converts the acceleration signal into a digitized acceleration signal; and
an object control unit that calculates a distance moved, wherein the object control unit receives the digitized acceleration signal, wherein the object control unit determines a first derivative of the digitized acceleration signal, wherein the first derivative is used to indicate a time period of an upward or downward movement of the device, and wherein the object control unit uses the first derivative of the digitized acceleration signal to start the calculation of the distance moved when the magnitude of the digitized acceleration signal is above a threshold.

2. The device of claim 1, wherein the object control unit generates a position signal indicating the position of the device.

3. The device of claim 1, wherein the object control unit generates an alarm signal when the distance moved as calculated by the object control unit exceeds a threshold.

4. The device of claim 1, wherein an object control unit calculates the distance moved in three dimensions.

5. A device comprising:
   an accelerometer that generates an x-acceleration signal and a z-acceleration signal, wherein the z-acceleration signal has a magnitude;
   an analog-to-digital converter (ADC), wherein the ADC converts the x-acceleration signal into a digitized x-acceleration signal and converts the z-acceleration signal into a digitized z-acceleration signal; and
   a control unit that calculates a magnitude of an x-distance, wherein the control unit receives the digitized x-acceleration signal and the digitized z-acceleration signal, wherein the control unit determines a first derivative of the digitized z-acceleration signal and uses the first derivative to indicate a time period during which the accelerometer moves in a z-dimension, and wherein the control unit uses the first derivative of the digitized z-acceleration signal to stop the magnitude of the x-distance from changing without stopping the accelerometer from generating the x-acceleration signal when the magnitude of the z-acceleration signal is above a threshold.

6. The device of claim 5, wherein the accelerometer comprises a first portion and a second portion, wherein the first portion generates the x-acceleration signal and a y-acceleration signal, and wherein the second portion generates the z-acceleration signal.

7. The device of claim 6, wherein the first portion is arranged in a substantially horizontal plane, and wherein the second portion is arranged in a substantially vertical plane.

8. The device of claim 5, wherein the control unit comprises a cursor location unit and a derivative generator.

9. The device of claim 8, wherein the derivative generator outputs and the cursor location unit receives a cursor movement disable signal, and wherein the magnitude of the x-distance stops changing when the cursor movement disable signal is asserted.

10. The device of claim 8, wherein the cursor location unit outputs an x-coordinate signal indicative of an x-coordinate of a cursor on a computer screen.

11. The device of claim 5, wherein the x-distance represents a distance that a cursor has moved along an x-axis of a Cartesian plane.

12. The device of claim 5, wherein the accelerometer generates a y-acceleration signal, wherein the ADC converts the y-acceleration signal into a digitized y-acceleration signal, wherein the control unit receives the digitized y-acceleration signal and calculates a magnitude of a y-distance, and wherein the control unit uses the first derivative of the digitized z-acceleration signal to stop the magnitude of the y-distance from changing when the magnitude of the z-acceleration signal is above a threshold.

13. The device of claim 5, wherein the device is part of a computer mouse.

14. The device of claim 5, wherein the device is part of a pen.

15. The device of claim 5, wherein the ADC and the control unit are part of a microcontroller.

16. A method comprising:
    (a) receiving an x-acceleration signal;
    (b) receiving a z-acceleration signal;
    (c) digitizing the z-acceleration signal to generate a digitized z-acceleration signal;
    (d) generating a first derivative of the digitized z-acceleration signal and using the first derivative to indicate a time period of movement in a z-dimension; and
    (e) generating a cursor movement disable signal using the first derivative of the digitized z-acceleration signal.

17. The method of claim 16, further comprising:
    (f) disabling a cursor from moving.

18. The method of claim 17, wherein the x-acceleration signal has a magnitude, wherein the cursor is disabled from moving in (f) over a disabled period, and wherein the disabled period includes a second time period during which the magnitude of the x-acceleration signal is changing.

19. The method of claim 16, wherein (a) through (e) are performed by a microcontroller.

20. The method of claim 16, wherein the z-acceleration signal has a magnitude, and wherein the cursor movement disable signal is asserted when the magnitude of the z-acceleration signal changes.

21. The method of claim 16, wherein the x-acceleration signal is generated by a first portion of an accelerometer, and the z-acceleration signal is generated by a second portion of the accelerometer.

22. A device comprising:
    an accelerometer that generates an x-acceleration signal, a y-acceleration signal and a z-acceleration signal, wherein the x-acceleration signal and the y-acceleration signal are used to scroll a cursor across a screen when the accelerometer moves, and wherein the x-acceleration signal has a magnitude; and
    means for disabling the cursor by generating a first derivative of the z-acceleration signal and using the first derivative to indicate a first time period during which the accelerometer moves in a z-dimension, wherein the cursor is disabled from moving across the screen during a disabled period, and wherein the disabled period includes a second time period during which the magnitude of the x-acceleration signal is changing.

23. The device of claim 22, wherein device is an accelerometer-based computer mouse.

24. The device of claim 22, wherein the accelerometer comprises a first portion and a second portion, wherein the first portion generates the x-acceleration signal and a y-acceleration signal, and wherein the second portion generates a z-acceleration signal.

25. The device of claim 22, wherein the means generates a pseudo square wave using the first derivative of the z-acceleration signal, and wherein the pseudo square wave is indicative of the first time period.

26. The device of claim 5, wherein the accelerometer is part of a computer mouse that controls a location of a cursor on a computer screen, and wherein the magnitude of the x-distance is stopped from changing when the computer mouse is lifted to adjust the location of the cursor on the computer screen.

27. A device comprising:
    an accelerometer that generates an x-acceleration signal and a z-acceleration signal, wherein the z-acceleration signal has a magnitude;
    an analog-to-digital converter (ADC), wherein the ADC converts the x-acceleration signal into a digitized x-acceleration signal and converts the z-acceleration signal into a digitized z-acceleration signal; and
    a control unit that calculates a magnitude of an x-distance, wherein the control unit receives the digitized x-acceleration signal and the digitized z-acceleration signal, wherein the control unit determines a first derivative of the digitized z-acceleration signal and uses the first derivative to indicate a time period during which the accelerometer moves in a z-dimension, wherein the control unit uses the first derivative of the digitized z-acceleration signal to stop the magnitude of the x-distance from changing without stopping the accelerometer from generating the x-acceleration signal when the magnitude of the z-acceleration signal is above a threshold, wherein the control unit uses the first derivative to generate a pseudo square wave, wherein the pseudo square wave includes noise with a highest peak, and wherein the pseudo square wave has a lowest notch whose magnitude is greater than that of the highest peak of the noise.

28. The device of claim 27, wherein the control unit generates a second derivative of the digitized z-acceleration signal and adds the second derivative to the first derivative to generate the pseudo square wave.

29. The method of claim 16, further comprising:
generating a pseudo square wave using the first derivative, wherein the pseudo square wave includes noise with a highest peak, and wherein the pseudo square wave has a lowest notch whose magnitude is greater than that of the highest peak of the noise.

30. A device comprising:
an accelerometer that generates an x-acceleration signal, a y-acceleration signal and a z-acceleration signal, wherein the x-acceleration signal and the y-acceleration signal are used to scroll a cursor across a screen when the accelerometer moves, and wherein the x-acceleration signal has a magnitude; and means for disabling the cursor by generating a first derivative of the z-acceleration signal and using the first derivative to indicate a first time period during which the accelerometer moves in a z-dimension, wherein the cursor is disabled from moving across the screen during a disabled period, wherein the disabled period includes a second time period during which the magnitude of the x-acceleration signal is changing, wherein the means generates a second derivative of the z-acceleration signal and adds the second derivative to the first derivative to generate a pseudo square wave, wherein the pseudo square wave includes noise with a highest peak, and wherein the pseudo square wave has a lowest notch whose magnitude is greater than that of the highest peak of the noise.

\* \* \* \* \*